(12) United States Patent
Brownell et al.

(10) Patent No.: US 6,994,743 B2
(45) Date of Patent: Feb. 7, 2006

(54) TWO STAGE AIR FILTER

(75) Inventors: Kyle A. Brownell, Schofield, WI (US); Scott W. Mathews, Mosinee, WI (US); Alan Lorenz Breitenfeldt, Wausau, WI (US); Emery W. Neitzel, Rothschild, WI (US)

(73) Assignee: Greenheck Fan Corporation, Schofield, WI (US)

( * ) Notice: Subject to any disclaimer, the term of this patent is extended or adjusted under 35 U.S.C. 154(b) by 0 days.

(21) Appl. No.: 10/829,525

(22) Filed: Apr. 22, 2004

(65) Prior Publication Data
US 2004/0194623 A1 Oct. 7, 2004

Related U.S. Application Data

(63) Continuation of application No. 10/090,040, filed on Mar. 1, 2002, now Pat. No. 6,797,041.

(51) Int. Cl.
B01D 50/00 (2006.01)
B01D 24/10 (2006.01)
B01D 45/12 (2006.01)

(52) U.S. Cl. .............. 95/268; 95/269; 95/274; 95/900; 55/337; 55/346; 55/466; 55/483; 55/484; 55/467; 55/516; 55/523; 55/486; 55/512; 55/DIG. 36; 96/135

(58) Field of Classification Search .......... 95/268, 95/269, 274, 900; 55/337, 346, 466, 483, 55/484, 467, 516, 522, 523, 486, 512, DIG. 36; 96/135
See application file for complete search history.

(56) References Cited

U.S. PATENT DOCUMENTS

| 2,978,064 A | * | 4/1961 | Deaver ............... 96/151 |
| 3,354,623 A | | 11/1967 | Keller |
| 3,955,949 A | | 5/1976 | Rohrer |
| 3,970,558 A | | 7/1976 | Lee |
| 4,042,352 A | | 8/1977 | Shujiro et al. |
| 4,082,661 A | | 4/1978 | Aoki et al. |
| 4,104,163 A | | 8/1978 | Grutsch |
| 4,105,422 A | | 8/1978 | Kiguchi |
| 4,118,206 A | | 10/1978 | Hagendoorn |
| 4,126,433 A | | 11/1978 | Forssberg et al. |
| 4,172,031 A | | 10/1979 | Hall et al. |
| 4,177,142 A | | 12/1979 | Halbfoster |
| 4,231,768 A | | 11/1980 | Seibert et al. |
| 4,238,334 A | | 12/1980 | Halbfoster |

(Continued)

FOREIGN PATENT DOCUMENTS

DE  74699  7/1970

(Continued)

OTHER PUBLICATIONS

G. Elliott et al, "The increasing Use of Ceramic Filters in Air Pollution Control Applications," Filtr. Sep. vol. 34 No. 4 pp. 331-335, 1997, Elsevier Science Ltd.

(Continued)

Primary Examiner—Robert A. Hopkins
(74) Attorney, Agent, or Firm—Quarles & Brady LLP

(57) ABSTRACT

A two stage air purification system is provided for the removal of airborne impurities from an airflow prior to the airflow entering a building's ductwork. In particular, a primary air filter is mounted within the hood of, for example, a cooking area and operable to receive grease-laden air and remove a portion of the impurities. The air is then sent to a secondary filter, also mounted within the hood, that removes additional impurities. The air is then sent through the building's ductwork and eventually out the building.

15 Claims, 5 Drawing Sheets

U.S. PATENT DOCUMENTS

| | | |
|---|---|---|
| 4,292,285 A | 9/1981 | Nakao et al. |
| 4,328,105 A | 5/1982 | Arbuckle |
| 4,350,504 A | 9/1982 | Diachuk |
| 4,388,086 A | 6/1983 | Bauer et al. |
| 4,484,563 A | 11/1984 | Fritz et al. |
| 4,485,622 A | 12/1984 | Takagi et al. |
| 4,534,775 A | 8/1985 | Frazier |
| 4,595,509 A | 6/1986 | Fox et al. |
| 4,604,110 A | 8/1986 | Frazier |
| 4,610,705 A | 9/1986 | Sarnosky et al. |
| 4,645,605 A | 2/1987 | Durham |
| 4,682,992 A | 7/1987 | Fuchs |
| 4,708,000 A | 11/1987 | Besik |
| 4,721,624 A | 1/1988 | Schumann |
| 4,805,525 A | 2/1989 | Bivens |
| 4,816,499 A | 3/1989 | Nomura et al. |
| 4,854,949 A * | 8/1989 | Giles et al. ............. 96/58 |
| 4,872,892 A | 10/1989 | Vartiainen et al. |
| 4,900,341 A | 2/1990 | Csabai |
| 4,908,050 A | 3/1990 | Nagashima et al. |
| 4,976,760 A | 12/1990 | Helferich et al. |
| 5,003,693 A | 4/1991 | Atkinson et al. |
| 5,087,272 A | 2/1992 | Nixdorf |
| 5,124,177 A | 6/1992 | Kasmark, Jr. et al. |
| 5,133,786 A | 7/1992 | Anderson |
| 5,145,648 A | 9/1992 | Miyahara et al. |
| 5,154,743 A | 10/1992 | Takato et al. |
| 5,171,720 A | 12/1992 | Kawakami |
| 5,179,061 A | 1/1993 | Haerle |
| 5,209,887 A | 5/1993 | Von Blucher et al. |
| RE34,636 E | 6/1994 | Bivens |
| 5,384,290 A | 1/1995 | Brezny |
| 5,404,799 A | 4/1995 | Bivens |
| 5,442,924 A | 8/1995 | Tsai et al. |
| 5,486,370 A | 1/1996 | Bivens |
| 5,497,620 A | 3/1996 | Stobbe |
| 5,512,088 A | 4/1996 | McKenzie |
| 5,567,090 A | 10/1996 | Basak et al. |
| 5,567,392 A | 10/1996 | Becker et al. |
| 5,624,875 A | 4/1997 | Nakanishi et al. |
| 5,628,916 A | 5/1997 | Stevens et al. |
| 5,632,889 A | 5/1997 | Tharp |
| 5,693,298 A | 12/1997 | Bar-Ilan |
| 5,700,973 A | 12/1997 | Siddiqui |
| 5,733,350 A | 3/1998 | Muller et al. |
| 5,750,026 A | 5/1998 | Gadkaree et al. |
| 5,766,458 A | 6/1998 | Sekhar et al. |
| 5,776,354 A | 7/1998 | van der Meer et al. |
| 5,792,360 A | 8/1998 | Algar |
| 5,810,895 A | 9/1998 | Staehle et al. |
| 5,976,221 A | 11/1999 | Bowman et al. |
| 5,997,618 A | 12/1999 | Schneider et al. |
| 6,010,558 A | 1/2000 | Ackland |
| 6,042,628 A | 3/2000 | Nishikiori et al. |
| 6,050,208 A | 4/2000 | Kennedy |
| 6,051,199 A | 4/2000 | Teller |
| 6,074,177 A | 6/2000 | Kobayashi et al. |
| 6,077,335 A | 6/2000 | Schneider et al. |
| 6,077,800 A | 6/2000 | Takahashi et al. |
| 6,095,037 A | 8/2000 | Savage et al. |
| 6,165,519 A | 12/2000 | Lehrer et al. |
| 6,168,651 B1 | 1/2001 | Tuma et al. |
| 6,235,090 B1 * | 5/2001 | Bernstein et al. ............. 96/57 |
| 6,237,587 B1 | 5/2001 | Sparling et al. |
| 6,251,153 B1 | 6/2001 | Neitzel et al. |
| 6,293,983 B1 | 9/2001 | More |
| 6,340,379 B1 | 1/2002 | Penth et al. |
| 6,432,177 B1 | 8/2002 | Dallas et al. |
| 6,464,770 B1 | 10/2002 | Palm et al. |
| 6,605,648 B1 | 8/2003 | Johnson et al. |
| 6,641,788 B1 | 11/2003 | Ogawa et al. |
| 6,814,783 B2 | 11/2004 | Fitch et al. |
| 6,833,022 B2 * | 12/2004 | Feisthammel et al. ......... 95/91 |
| 2003/0024393 A1 | 2/2003 | Lim |
| 2004/0011203 A1 | 1/2004 | Fitch |

FOREIGN PATENT DOCUMENTS

| | | |
|---|---|---|
| EP | 1238679 | 9/2002 |
| FR | 2700712 A1 * | 7/1994 |
| GB | 1014594 | 12/1965 |
| GB | 1255268 | 12/1971 |
| WO | WO 02/070105 A2 | 9/2002 |

OTHER PUBLICATIONS

N. Singh et al., "Precess Design and Economic Analysis of a Ceramic Membrane System for Microfiltration of Com Starch Hydrolysate," Journal of Food Engineering, vol. 38 No. 1 pp 57-67 1998 Elsevier Science Ltd.

* cited by examiner

TWO STAGE AIR FILTER

CROSS-REFERENCE TO RELATED APPLICATIONS

This application is a Continuation Application of U.S. patent application Ser. No. 10/090,040 filed Mar. 1, 2002 now U.S. Pat. No. 6,797,041, and claims priority thereto.

BACKGROUND OF THE INVENTION

The present invention relates generally to air filters, and in particular, relates to air purification systems for commercial kitchens.

Air purification systems are primarily used to extract impurities, such as grease, from grease-laden air formed in commercial kitchens and other similar environments during cooking. Grease extractors are typically a cleanable or replaceable component of kitchen ventilation systems disposed above a cooking area, such as a stove or the like. A fan in the ventilation system draws grease-laden air through the filter media which extracts the grease from the air prior to exhausting the air into the atmosphere. The extracted grease may run down the filter wall and be collected for proper disposal, or the grease may be trapped within the filter media that may be subsequently cleaned.

Conventionally, a primary air filter is mounted onto the hood of a cooking area for the removal of large grease and other airborne particles before the air travels through the ductwork of a building and is ultimately expelled into the outside environment. A secondary air filter is located at the outlet of the building's ductwork to remove additional smaller air impurities before the air is released. Various filters are available for such an air purification system.

Conventional centrifugal air filters cause air to enter a helical path in a vortex chamber and subject the impurities to a centrifugal force. The impurities are propelled away from the vortex center and impinge upon chamber walls. The air exits the vortex chamber leaving the impurities behind in the chamber. One such centrifugal air filter is described in U.S. Pat. No. 6,251,153 entitled "Centrifugal Air Filter" the disclosure of which is hereby incorporated by reference as if set forth in its entirety herein. Centrifugal air filters are advantageous in that the extracted air impurities run down the filter wall and are collected for proper disposal, thereby minimizing the need for cleaning and other maintenance efforts that could cause down-time. While air filters of this type are effective at removing large air impurities that may be flung against the side of the filter, smaller impurities may remain in the air and travel into the ductwork and fan of the building.

Baffle filters define an enclosure having an inlet that receives grease laden air. The enclosure defines a plurality of baffle plates that force the air to abruptly change the direction of travel several times prior to exiting the filter. As the air changes direction, grease and other impurities are propelled away from the air stream and impinge upon the chamber walls. The grease may then run down into a collection cup.

Another type of filter, known as an impact filter, traditionally includes a wire mesh bed packed with filtration particles. As air is drawn through the impact filter, the media will trap impurities therein such that a cleaner air is output. While impact filters are successful at removing both large particles suitable for a centrifugal fan along with smaller particles that may escape a centrifugal fan, depending on the filter media, they often accumulate a significant amount of dirt in a relatively short period of time. The accumulation presents a blockage to the air passing therethrough, which produces a significant pressure drop across the filter and limits the air flow rate through the purification system and ultimately the cleanliness of the air passing through. Impact filters thus require frequent cleaning and maintenance.

While such air purification systems are suitable for their intended purpose, grease and other volatile organic compounds (VOC's) tend to accumulate within the ductwork, thereby necessitating frequent maintenance and cleaning.

It is thus desirable to provide a reliable air purification system that removes both large and small particles from the air prior to the air entering a building's ductwork.

BRIEF SUMMARY OF THE INVENTION

The present invention provides an air purification system for receiving incoming air containing impurities and outputting purified air into ductwork of a building. The system includes a hood defining a hood outlet in communication with the ductwork. A primary filter member is mounted to the hood for receiving the incoming air, removing at least a portion of impurities therefrom, and outputting a primary airflow. A secondary filter member is mounted to the hood at a location downstream of the primary filter and receives the primary output airflow. The secondary filter member has a secondary filter media that is operable to remove impurities from the primary airflow and output a secondary airflow to the hood outlet that is cleaner than the primary airflow.

A general objective of the present invention is to provide an air purification assembly achieving an improved extraction of airborne impurities from an airflow prior to the airflow traveling within the internal ductwork of a building. By providing a first filter member for removing impurities and a second filter member for removing additional impurities, a cleaner air is output to the ductwork, thus reducing the frequency of maintenance to the ductwork.

These and other objects and advantages of the invention will be apparent from the description that follows. In the description reference is made to the accompanying drawings which form a part hereof and in which there is shown by way of illustration, and not limitation, embodiments of the invention. Such embodiments do not necessarily represent the full scope of the invention. Reference should therefore be made to the claims herein for interpreting the scope of the invention.

BRIEF DESCRIPTION OF THE DRAWINGS

Reference is hereby made to the following figures in which like reference numerals correspond to like elements throughout, and in which.

DETAILED DESCRIPTION OF THE INVENTION

Figure 1:
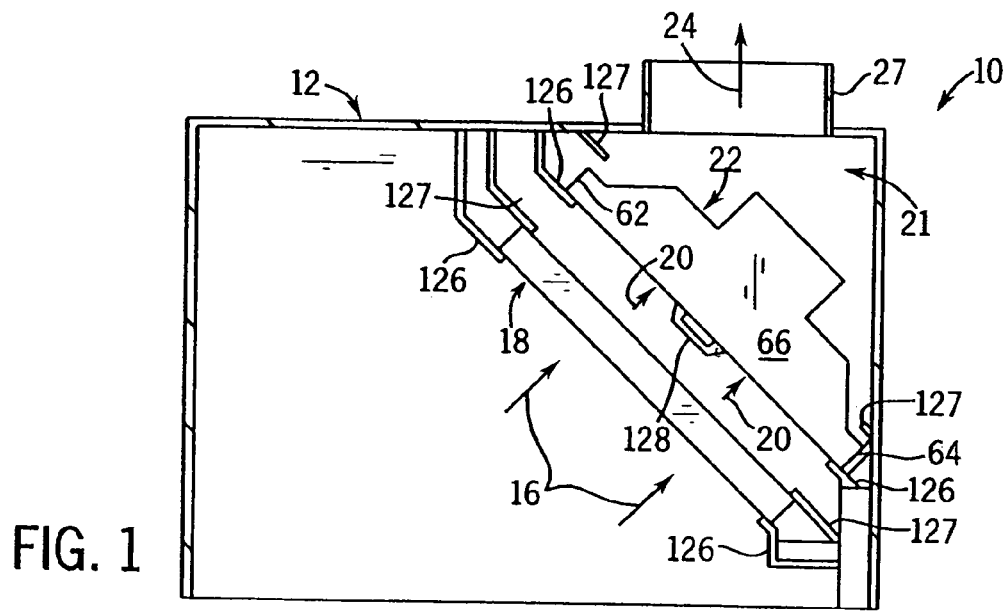
FIG. 1 is side elevation view of a ventilation hood having a primary air filter and secondary air filter constructed in accordance with the preferred embodiment.

Referring initially to FIG. 1, an air purification system 10 suitable for extracting grease and other particles, such as VOC'S, from grease-laden air is mounted on an angle at one end of a ventilation hood 12 that is disposed above a food cooking area (not shown). Hood 12 defines an outlet to a duct collar 27 that provides an interface from the hood to the ductwork system (not shown) of the building. In particular, a primary air filter 18 is angularly mounted within the hood 12 that, along with the interior walls of the hood, defines an enclosure 21 disposed between the filter and outlet duct collar 27. The enclosure 21 ensures that only filtered air is able to travel into the duct collar 27. A secondary filter 22 is also angularly mounted within the hood at a location within the enclosure between the primary filter 18 and the duct collar 27. In particular, lower and upper guide rails 126 and 127, respectively, extend laterally across the hood 12 and supports the outer ends of the filter 22, as will be described in more detail below.

During operation, a fan (not shown) draws grease-laden air 16 into the hood 12 and through the primary air filter 18 to remove large particles from the air. The partially cleaned air 20 is subsequently drawn through the secondary air filter 22 for the removal of smaller particles from the air that were not removed by the primary filter 18. "Clean" air 24 is thus expelled from the hood 12 through the duct collar 27 and travels through the internal ductwork and out the building. Advantageously, the internal ductwork of the building does not accumulate dirt and grease as quickly as conventional systems that use a secondary filter at the outlet of the building's ductwork.

Figure 2:
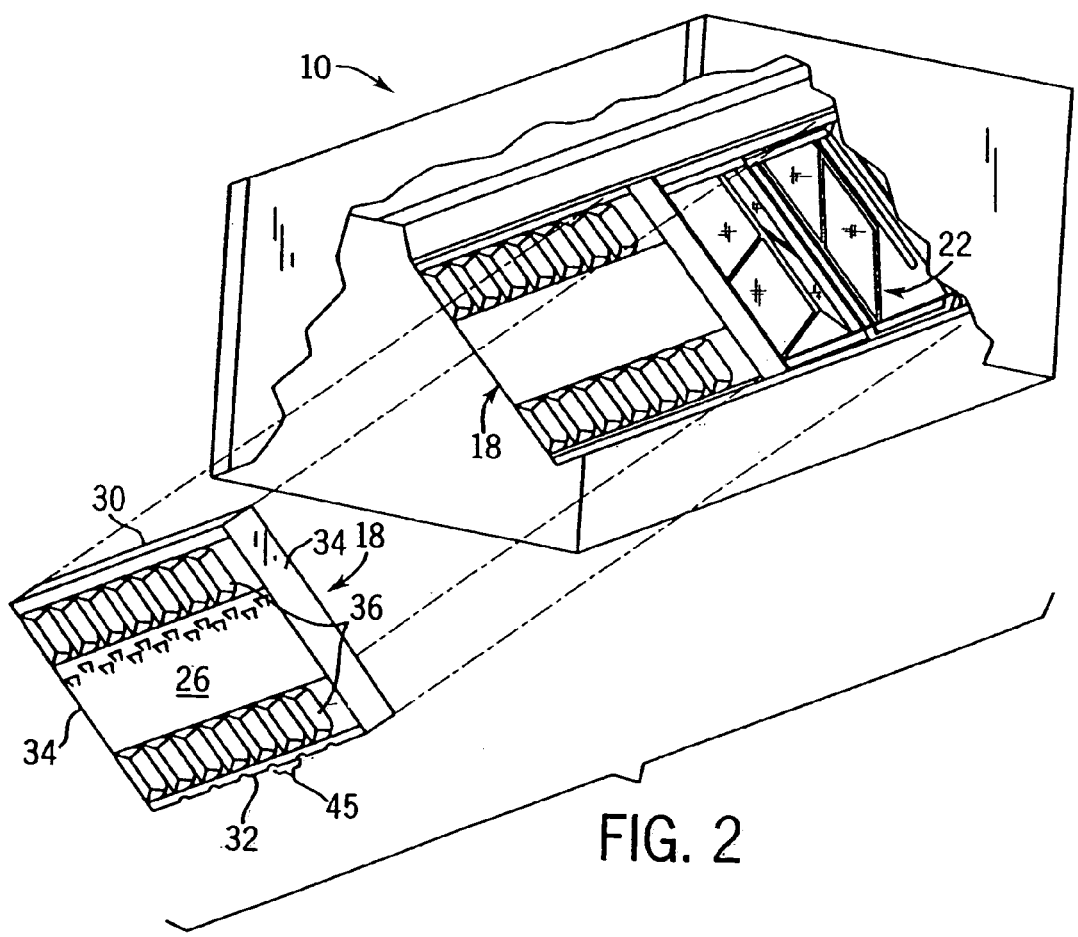
FIG. 2 is an exploded perspective view of the ventilation hood illustrated in FIG. 1 to further illustrate the primary air filter.
Figure 3:
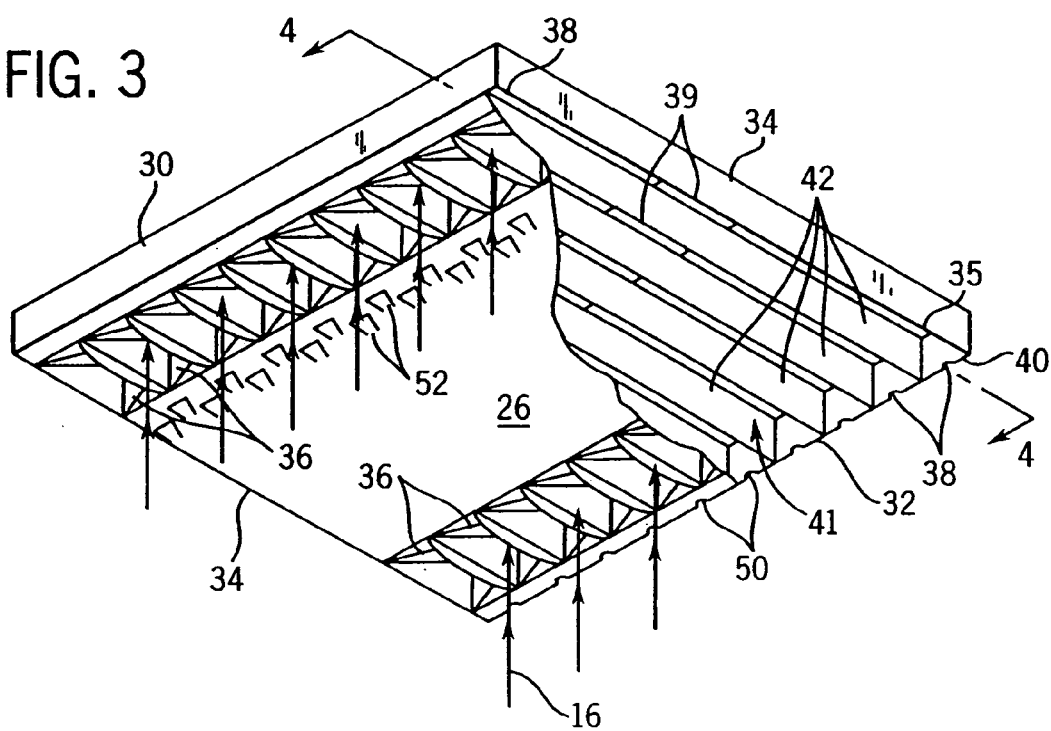
FIG. 3 is a cut away front perspective view of the primary cross sectional view of the primary air filter illustrated in FIG. 1.
Figure 4:
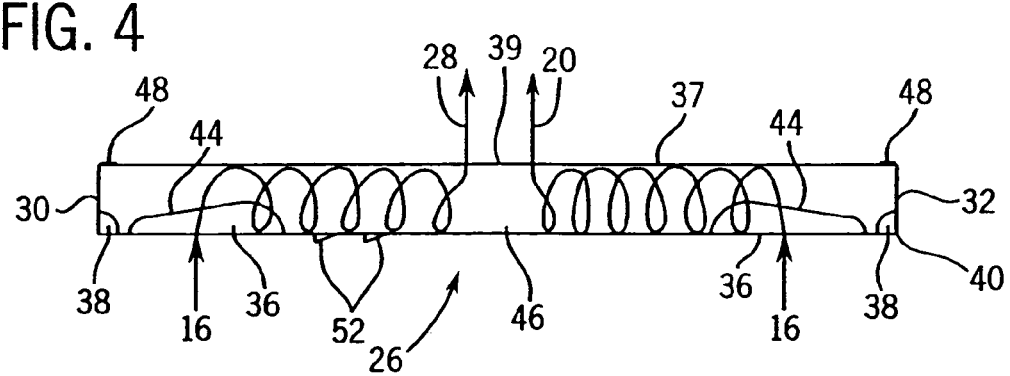
FIG. 4 is a sectional side elevation view of the air filter illustrated in FIG. 3 taken along line 4—4.

Referring particularly to FIGS. 2–4, the primary air filter 18 has a front wall 26 and a rear wall 28 joined at its perimeter by a top wall 30, bottom wall 32, and opposing sidewalls 34. The cavity formed by the walls 26, 28, 30, 32, and 34 is divided into a plurality of separate vortex chambers 35.

Each vortex chamber 35 has a pair of inlets 36 located at opposite ends 38 of the vortex chambers 35, and a single outlet 39 located at the midpoint of the chamber 35. Grease-laden air 16 enters a vortex chamber 35 through the pair of inlets 36 formed in the filter front wall 26, and exits the chamber 35 through the outlet 39 formed in the filter rear wall 28. The filter 18 captures the grease by directing the grease-laden air 16 along a helical path through the vortex chambers 35. The helical path causes the grease particles suspended in the air to impinge against the chamber walls and then flow along the chamber wall to a collection point. Forming the inlets 36 proximal opposing chamber ends 38 prevents the air 16 entering each inlet 36 from passing directly to the outlet 39 and avoiding the helical path. This ensures that a maximum amount of grease is extracted from the air 16.

In accordance with the preferred embodiment, the filter 18 includes a tray-shaped base 40 with the filter front wall 26, and a top wall 30, bottom wall 32, and side walls 34 defining the filter perimeter. The walls 30, 32, and 34 extend rearwardly and substantially perpendicular from the front wall 26 to form a tray cavity 41. Dividers 42 dividing the cavity 41 and defining the vortex chambers 35 in cooperation with the base 40 are mounted in the cavity 41. The base 40 is preferably formed from a single sheet of material to eliminate seams and facilitate cleaning the filter front wall 26.

The pairs of inlets 36 are formed in the front wall 26 and provide an entry for the grease-laden air 16 into the chambers 35. The inlet pairs 36 are spaced along the front wall substantially parallel to the base side walls 34. Preferably, the front wall 26 is deformed rearward to form vortex generators 44 at each inlet 36. The vortex generators 44 direct air 16 entering the inlet 36 into a helical path inside the chamber 35 toward the chamber center 46.

The dividers 42 are retained in the cavity 41 by folding flaps 48 over the dividers 42 inserted therein. Looking particularly at FIG. 4, the flaps 48 are formed on rear edges of the base top 30, bottom 32, and sides 34 which are folded over to retain the interlocked dividers 42 in the base cavity 41. Advantageously, folding the flaps over the dividers minimizes air leaks from the chambers 35. The flaps 48 are secured at each base corner and sides using methods known in the art, such as using tack welds, spot welds, screw type fasteners, and the like, to prevent the flaps 48 from inadvertently releasing the dividers 42.

Grease impinged onto the vortex chamber walls drains out of the chamber 35 through apertures 50 punched in the base bottom 32 at the end 38 of each chamber 35. During heavy grease loading of the filter, similar to heavy duty cooking, the vortex generators 44 can become loaded with grease. This heavy loading of grease may develop into runs down the front wall 26. To prevent the runs from running completely down the entire front face 26, small louvers 52 are formed, such as by punching into the front face just below the vortex generators 44 at each inlet 36 proximal the filter top. Two rows of staggered louvers 52 are used to cover the entire surface (left to right). The staggered louvers 52 assure any runs from the vortex generators 44 will be caught by a louver.

The louvers 52 need only be formed on the top portion of the filter, and not the bottom, making the filter top to bottom orientation specific. However, if the louvers are not required, the apertures 50 can be punched in the base top 30 and bottom 32 allowing the filter 18 to be mounted in the hood 12 without reference to the filter top 30 or bottom 32 orientation.

To simplify the filter assembly 18 and reduce assembly costs, the vortex chambers 35 are formed by interlocking dividers 42 which are inserted into the cavity 41. The elongated L-shaped dividers 42 are inserted into the tray cavity 41 and cooperate with the base 40 and adjacent dividers 42 to form the elongated vortex chambers 35. Each divider 42 extends the width of the base 40 and has a side wall substantially parallel to the base side walls 34 and a rear wall 37 substantially parallel to the front wall 22 to form the filter rear wall 28. The rear wall of each divider 42 is disposed above a different pair of inlets 36 and has a notch formed generally centrally therein defining the chamber outlet 39. Edges of the divider rear wall and side walls are bent inward and abut the base 40 or adjacent divider 42 to minimize air leaks.

The dividers 42 are preferably formed from the same material using the same processes as the base 40 and are interlocked to simplify the filter assembly 18. Tabs formed in each divider 42 extend into slots formed in the adjacent divider 42 to lock adjacent dividers 42 together. The tab and slot construction eliminates a need to spot weld or otherwise secure each individual divider 42 in the cavity 41.

By providing a vortex chamber 35 having front inlets 36 and a rear outlet 39, the air enters and exits the filter 18 in substantially parallel directions to enable the air to easily enter the secondary filter 22, as will be described in more detail below. This arrangement furthermore provides a more compact filter 18 relative to an air filter in which the air exits the air filter substantially perpendicular to the air entering the filter, such as through the chamber ends. Furthermore, a rear outlet air filter does not require a specially adapted ventilation hood to channel air exiting the chamber ends into the hood.

In another embodiment, the base, dividers or portions thereof are coated with a dry lubricant, such as described in U.S. Pat. No. 6,050,258 entitled "Exhaust fan with dry lubricant coating" the disclosure of which is hereby incorporated by reference as if set forth in its entirety herein.

It should be appreciated that conventional centrifugal filters are not capable of removing all grease and other impurities from grease-laden air. For this reason, a secondary filter has been conventionally installed at the outlet of a building's ductwork to further remove pollutants before the air is emitted into the environment. However, the partially cleansed air output by the primary filter leaves grease, dirt, and sludge on the interior of the ductwork and in the plenum of the hood, thereby necessitating frequent cleaning and maintenance.

In accordance with the preferred embodiment, a secondary filter 22 is mounted within the hood at a position downstream of primary filter 18 within the enclosure 21, and receives the partially cleaned air (primary airflow) 20 from the primary filter. It should be appreciated that the term "downstream" is used herein with reference to the direction of airflow 16, 20, and 24. As will be described in more detail below, secondary filter 22 is an impact filter whose filter media includes beads (either porous or nonporous) that remove additional impurities from the air 20. It should be appreciated, however, that the term "filter media" is broadly used herein to define any filter mechanism that is operable to remove air-borne particles, including the structure of centrifugal filter 18. Clean air (secondary airflow) 24 is thus output and received by a duct collar 27 that extends from the hood 12 and connects to the buildings internal ductwork. The air 24 may thus travel directly out the building without being further cleansed, thereby increasing the time interval between regular duct cleanings and reducing the risk of fire. Furthermore, because the secondary filter 18 is disposed within the hood 12, it is more accessible to the user, for example, when the filter is to be cleaned.

Figure 7:
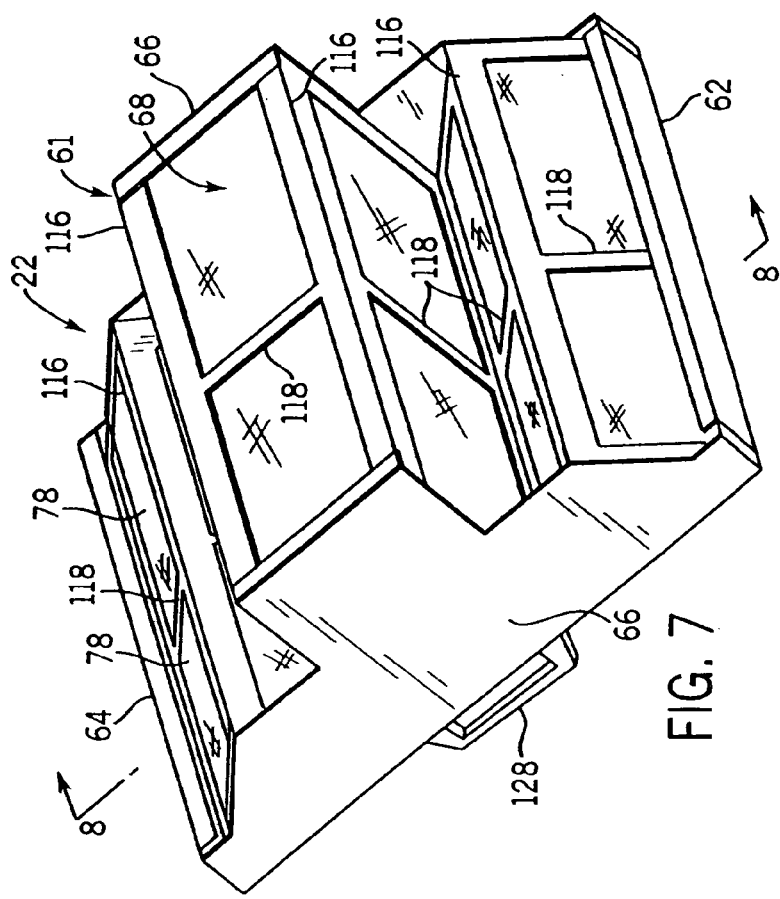
FIG. 7 is a perspective view of the secondary air filter illustrated in FIG. 1 showing the outlet.
Figure 6:
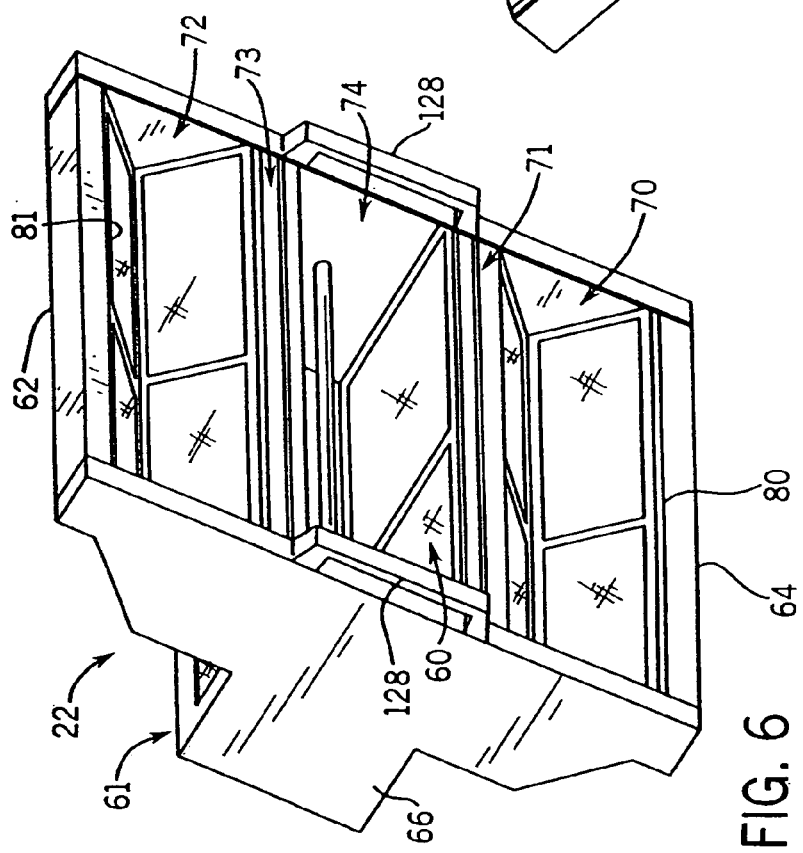
FIG. 6 is a perspective view of the secondary air filter illustrated in FIG. 1 showing the inlet.
Figure 8:
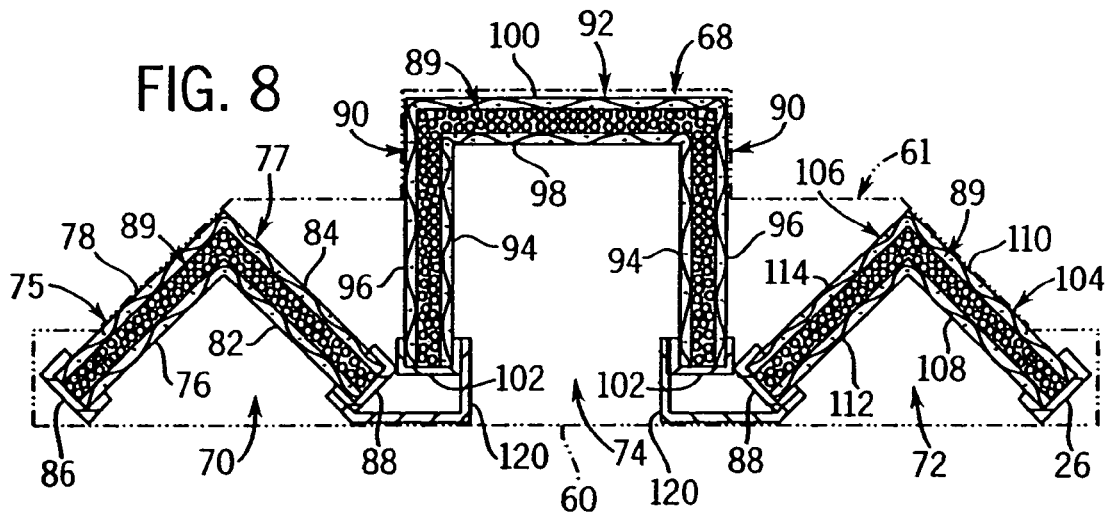
FIG. 8 is a sectional side elevation view of the secondary air filter illustrated in FIG. 7; taken along the line 8—8.

Referring now to FIGS. 6–8, the secondary air filter 22 includes a frame 61 that defines a front face 60 operable to receive incoming air. The front face 60 has an outer periphery defined by a top wall 62, bottom wall 64, and opposing end walls 66. A rear surface 68 is disposed opposite the front face 60, and allows cleaned air to exit the filter 22. The cavity formed by the walls 60, 62, 64, and 66 is partitioned into two outer air intake chambers 70 and 72, and a middle air intake chamber 74 by dividers 71 and 73 that extend across the front face 60. The front face 60 defines an inlet to the three chambers. It will become appreciated from the description below that the shape of intake chambers 70, 72, and 74 provide a greater surface area to the incoming air, thereby increasing the efficiency of the filter 22 over conventional flat filter designs.

The rear surface 68 is used herein to collectively identify the respective rear walls of each intake chamber, it being appreciated that the rear surface is not necessarily a flat or continuous wall. For instance, the rear surface 68 at the outer chamber 70 is defined by first and second outer walls 75 and 77, respectively. In particular, first wall 75 extends outwardly from the front end 80 of the bottom wall 64 at a 45° angle. The second wall 77 extends inwardly at a 90° angle from the distal end of wall 75 to the front face 60 of the chamber 70 (and thus defines a 45° angle with respect to the front face 60). The first and second walls 75 and 77, along with the front face 60, define a substantially right triangle when viewed in cross section, as illustrated in FIG. 8.

The first wall 75 is defined by a pair of inner and outer wire mesh screens 76 and 78 that extend parallel to each other and spaced apart to form a gap therebetween that houses a filter media 89. Likewise, the second wall 77 is defined by a pair of inner and outer wire mesh screens 82 and 84, respectively, that are connected to the outer ends of screens 76 and 78, respectively. Screens 82 and 84 extend parallel to each other, and are spaced apart to form a continuous gap with screens 76 and 78. The distal ends of screens 76 and 78 are sealed by an outer clip 86, and the distal ends of screens 82 and 84 are sealed by an inner clip 88. The enclosure defined by two pairs of screens and clips 86 and 88 ensures that air passing through chamber 70 will pass through the filter media 89.

The rear surface 68 at the middle chamber 74 is defined by two side walls 90 that extend perpendicularly outwardly from the front face 60, and a laterally extending top wall 92 that joins the outer ends of walls 90. Walls 90 and 92, along with front face 60, define a substantially rectangular chamber 74 when viewed in cross section. Side walls 90 include inner and outer wire mesh screens 94 and 96, respectively, that are offset from one another a predetermined distance to define a space therebetween that houses the filter media 89. Upper wall 92 includes and inner and outer pair of screens 98 and 100, respectively, that are connected to the outer ends of inner and outer screens 94 and 96, respectively, and are offset to define a gap therebetween that is also occupied by the filter media 89. The inner ends of screens 94 and 96 are sealed by clips 102 to define an enclosure to ensure that all air entering into the middle chamber 74 will pass through the filter media 89.

Outer chamber 72 is similar to chamber 70, and is defined by a first wall 104 that extends outwardly from the front end 81 of bottom wall 62 at a 45° angle. A second wall 106 extends inwardly at a 90° angle from the distal end of wall 75 towards the front face 60 of the chamber 72. For instance, the rear surface 68 is thus defined at the outer chamber 72 by the first and second walls 104 and 106, respectively. The first and second walls 75 and 77, along with the front face 60, define a substantially right triangle when viewed in cross section.

The first wall 104 is defined by a pair of an inner and outer wire mesh screens 108 and 110 that extend parallel to each other and spaced apart to form a gap therebetween that houses filter media 89. Likewise, the second wall 106 is defined by a pair of inner and outer wire mesh screens 112 and 114, respectively, that are connected to the outer ends of screens 76 and 78, respectively, and are also spaced apart to house the filter media. Screens 112 and 114 extend parallel to each other, and are spaced apart to define a gap that houses filter media 89. The distal ends of screens 76 and 78 are sealed by outer clip 86, and the distal ends of screens 82 and 84 are sealed by inner clip 88. The enclosure defined by two pairs of screens and clips 86 and 88 ensures that all air entering chamber 72 passes through the filter media.

During operation, incoming air 20 is received normal to the front face 60 of secondary filter 22 and is directed into each of the chambers 70, 72, and 72. Air 20 then passes through the inner screens defining the chamber walls, where airborne particles are removed by the filter media prior to exiting filter 22 via the outer screens. Clean secondary air 24 is then directed through the duct collar 27 and through the building's internal ductwork system before being expelled into the outdoor environment.

The inner and outer screens that define the walls of chambers 70, 72, and 74 are preferably spaced apart a distance less than one inch, and preferably less than ½ inch in accordance with the preferred embodiment, though it should be appreciated that any distance could be used in accordance with the present invention. Advantageously, it has been determined that the inner and outer screens may be positioned far enough apart that the pressure drop across the secondary filter 22 is no greater than 2 in H2O for a given airflow with a packed bed of filter media, as is described in more detail below.

Because air flowing through the filter 22 may exert a significant amount of pressure on the chamber walls, the outer surfaces of the outer screens of each chamber are supported by walls 116 that extend between end walls 66 at the junction between two screens. Walls 116 further act to seal each interface to ensure that all air entering the secondary filter 22 passes through the filter media 89. The screens are further supported by laterally extending beams 118 that join the midpoints of walls 116. A pair of walls 120 extends along the front face 60 and encapsulate clips 88 and 102 to provide a seal at the interface between outer chambers 70 and 72 and middle chamber 74. Walls 116 thus further prevent the incoming air 20 from flowing through the filter 22 without passing through the filter media 89.

While the chamber walls have been described herein as being defined by inner and outer wire mesh screens, it should be appreciated that the walls could be made out of any suitable porous material that is able to provide an adequate air flow rate therethrough.

Figure 10:
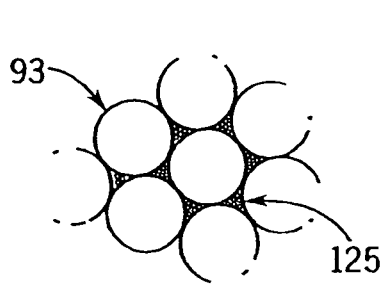
FIG. 10 is an illustration of a nonporous filter media used in the secondary air filter in accordance with an alternate embodiment.
Figure 9:
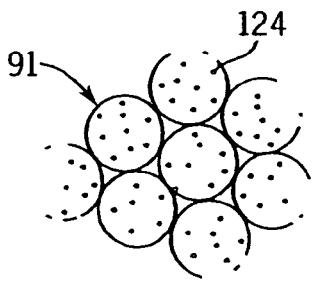
FIG. 9 is an illustration of a porous filter media used in the secondary air filter in accordance with the preferred embodiment.

Referring now to FIGS. 9 and 10, the filter media 89 comprises generally spherical beads 91 that are capable of absorbing grease from the incoming air 20. During manufacturing, a first end plate 66 is attached to walls 62 and 64. The beads 91 are poured between the inner and outer chamber screens at the other end to produce a packed bed of beads or any alternative material suitable for use in combination with the present invention. The second end plate 66 is subsequently attached to enclose the chamber walls. It should be appreciated that the diameter of the beads may vary, but a diameter between 1 and 4 mm is currently contemplated. The beads 91 are capable of removing smaller air impurities that were not removed by the primary filter 18. Advantageously, because end plates 66 are attached to the frame via nuts and bolts (not shown), an end user is able to remove the end plate 66 and the used beads 91, and insert new beads 91 into the filter without having to replace the entire filter 22.

Referring to FIG. 9 in particular, beads 91 are porous, and may comprise silica gel, a ceramic, a diatomaceous earth, zeolite, or any other porous material deemed suitable and durable enough to be made into a bead-like form and packed into a filtration device. Silica gel is used in accordance with the preferred embodiment because of its high affinity to grease in comparison to water vapor. While silica gel has been used in the past as an oil filter, the present invention recognizes that silica gel may further be used for the removal of grease and other impurities (e.g., VOC's) from grease-laden air.

During operation, grease-laden air 20 enters through the chamber walls and passes through the beads 91. The beads 91 act as baffles that cause the incoming air to make several sudden changes in direction such that the grease and other particles suspended in the air impinge against the beads and are absorbed into the interstices 124 of the filter media 89 during normal operation. Advantageously, because the impurities are stored within each bead 89, the gaps between adjacent porous beads are free of dirt, thereby enabling air to easily pass through the filter 22 without producing a significant pressure drop across the chamber walls. Once the beads become saturated, grease may begin to accumulate within the air gaps located between adjacent beads 91. Accordingly, it may be desirable to install a collection cup (not shown) to receive any grease that accumulates, as will now be described with reference to FIG. 10.

In particular, the filter media 89 may alternatively comprise nonporous beads 93, such as metallic beads, glass beads, or any other nonporous material suitable for use with the present invention. In accordance with this embodiment, the airborne grease and other impurities impinge against the beads and accumulate within the air gaps 125 formed between adjacent beads. As impurities accumulate, the pressure drop across chamber walls begins to rise until the drop is sufficiently great that incoming air drives the grease off the beads 89. The filter 22 would include a collection cup (not shown) to capture the impurities when nonporous beads 91 are used.

It should be appreciated that still other filter media 89 could be used with the secondary filter 22. For example, the filter media 89 could comprises a porous ceramic structure that is in the shape of the interior defined by any of walls 75, 77, 90, 92, 104, and 106 such that the walls are fabricated around the ceramic structure. In accordance with this embodiment, incoming air 20 passes through the porous structure, whose pores absorb the impurities that were not removed by the primary filter 18. A ceramic filter media has been found to exhibit a sufficient affinity to grease in comparison to water vapor, and is thus suitable for use as a filter media in secondary filter 22.

Both the primary and secondary filters may be regenerated using a commercial dishwasher and standard dishwasher detergents to remove grease and VOC's. In some instances, such as the case where the pores extend completely through the beads, the filter should be soaked in a solution of commercial detergent in order to break down the grease which has been absorbed prior to removal of the grease in a commercial dishwasher.

Figure 5:
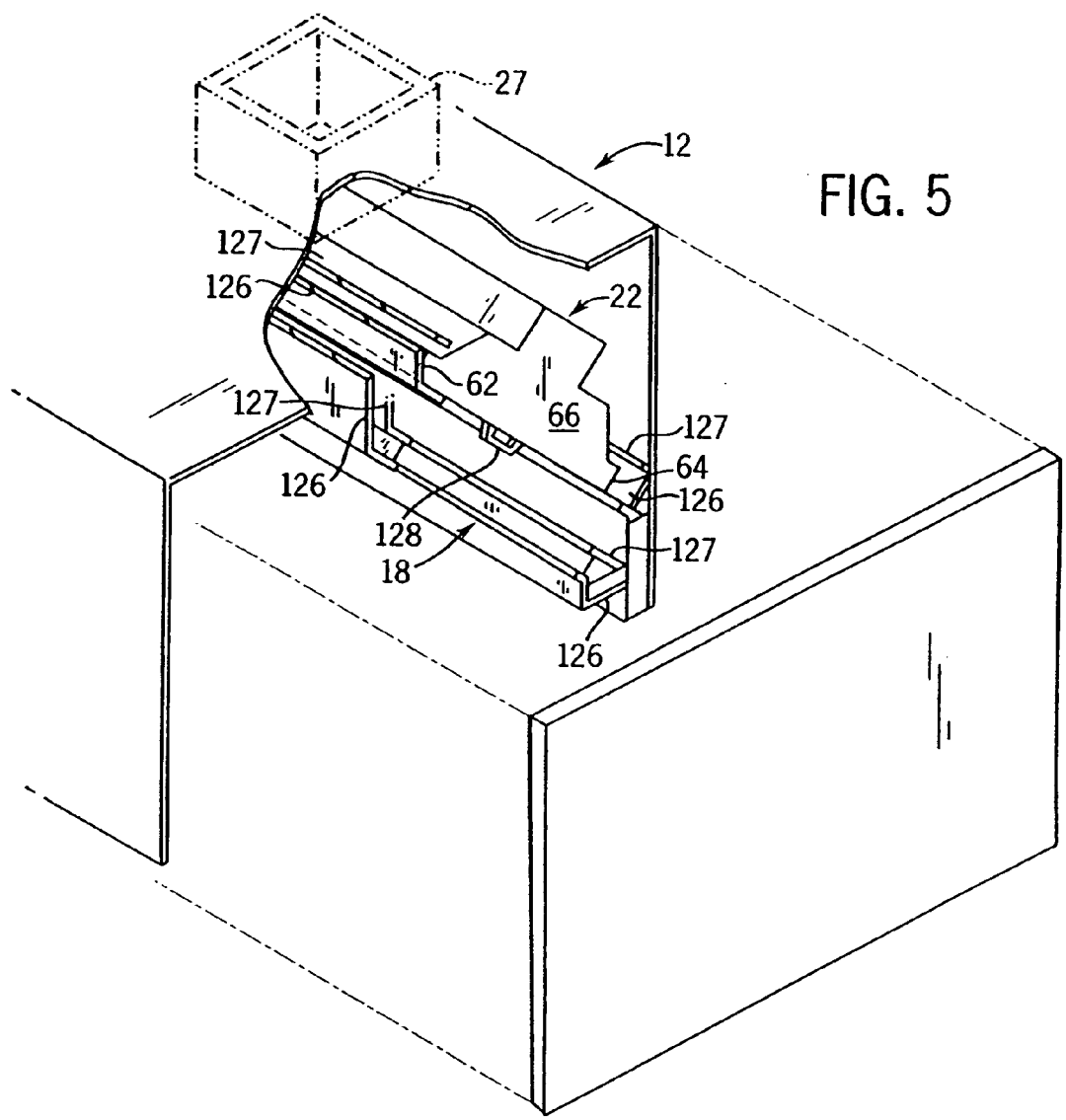
FIG. 5 is a perspective view of the hood illustrated in FIG. 1 with a portion cut away showing the removal of the filters.

Referring to FIG. 5, both the primary and secondary filters 18 and 22 rest on guide rails 126 and 127 that facilitate their removal from the hood 12. FIG. 5 illustrates the removal of the secondary filter 22, though it should be appreciated that the primary filter 18 is removable in the same manner. In particular, a pair of handles 128 extends from the front of end walls 66 to enable the easy removal and transport of filter 22. Guide rails 126 and 127 are spaced a sufficient distance such that a user may lift filter 22 up against the lower edge of upper guide rails 127 to provide clearance to swivel bottom wall 64 past the corresponding lower guide rail 126. Once one wall 64 has been disengaged from the guide rails 126 and 127, the upper wall 62 may be easily removed from engagement with its set of guide rails. It should be appreciated that a similar system may be used to removably mount the primary filter 18.

Figure 11:
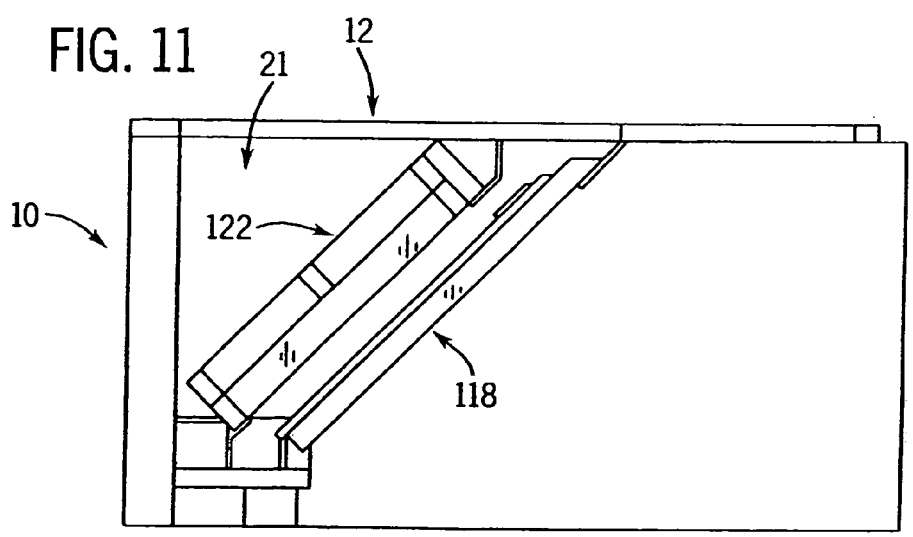
FIG. 11 is a side elevation view of a ventilation hood constructed in accordance with an alternate embodiment of the invention.

Referring now also to FIG. 11, a flat secondary filter 122 could be installed downstream of primary filter 18 in accordance with an alternate embodiment of the invention. However, it should be appreciated that hoods having only the primary air filter 18 installed are currently commercially manufactured in systems that employ a secondary filter at the outlet of a building's internal ductwork system. Because secondary filter 122 is flat, it would have to be elongated more than filter 22 in order to provide a great enough surface area to effectively and reliably clean the air 20 while supporting a sufficient air flow rate. However, the position of primary filter 18 in conventional systems would not allow for a sufficiently elongated secondary filter to be installed within enclosure 21. Accordingly, primary filter 18 would need to be moved back within the hood 12 in order to accommodate a further elongated secondary filter 122. The installation of a flat secondary filter 122 would thus necessitate that the manufacturing process of hood 12 be modified, which would consume additional expense and resources.

Advantageously, the chamber walls 75, 77, 90, 104, and 106 of filter 22 extend at least partially outwardly from the front face 60. Filter 22 thus utilizes the lateral distance allowed by the conventional hood 14 along with the available depth within the enclosure 21 to achieve a greater surface area than flat filter 122 without occupying a greater amount of lateral space within the hood 12. Conventional filter walls have been known to extend up to 45° from the front surface. However, the walls 90 of secondary filter 22 extend up to 90° from the front face, it being appreciated that any angle greater than 45° with respect to the front surface 60 will provide a greater surface area than the prior art. The increased surface area achieved by the walls of chambers 70, 72, and 74 enables a greater flow rate through the filter 22 and also achieves a high efficiency. The preferred embodiment thus enables the installation of secondary filter 22 in the hood 12 without having to modify conventional manufacturing and assembly of the hood/primary filter assembly.

While the present invention has been described with reference to a primary centrifugal air filter 18 and a secondary impact air filter 22, it should be appreciated that other filters could be used in an air purification system having a first stage that collects a large portion of the larger size airborne particles and a subsequent stage or stages that removes smaller particles not removed in the first stage and non-particle contaminants such as Volatile Organic Compounds prior to the air entering a building's internal ductwork. For example, filters 18 and 22 could comprise any one of a centrifugal filter, a baffle filter, an impact filter, or any other like filter suitable for removing airborne impurities.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

We claim:

1. An air purification system for removing airborne particles from an airflow, the system comprising:
    a hood having an inlet for receiving the airflow from a space beneath the hood and a hood outlet for exhausting the airflow to a duct;
    a first filter mounted within the hood and disposed in the airflow to remove therefrom at least some of the airborne particles to produce a first-filtered airflow; and
    a second filter mounted within the hood and disposed downstream of the first filter to receive the first-filtered airflow, the second filter having a porous filtration chamber containing at least one filtration member and the first-filtered airflow flows through the filtration chamber and the filtration member removes airborne particles from the first-filtered airflow to produce second-filtered airflow that is exhausted through the hood outlet,
    wherein the airflow path between the first and second filters defines a substantially straight path; and
    wherein the filtration member is formed from a ceramic.

2. The air purification system as recited in claim 1, wherein the second filter further comprising a plurality of ceramic filtration members.

3. The air purification system as recited in claim 2, wherein the ceramic is porous.

4. An air purification system for removing airborne particles from an airflow, the system comprising:
    a hood having an inlet for receiving the airflow from a space beneath the hood and a hood outlet for exhausting the airflow to a duct;
    a first filter mounted within the hood and disposed in the airflow to remove therefrom at least some of the airborne particles to produce a first-filtered airflow; and
    a second filter mounted within the hood and disposed downstream of the first filter to receive the first-filtered airflow, the second filter having a porous filtration chamber containing at least one filtration member and the first-filtered airflow flows through the filtration chamber and the filtration member removes airborne particles from the first-filtered airflow to produce second-filtered airflow that is exhausted through the hood outlet,
    wherein the airflow path between the first and second filters defines a substantially straight path; and
    wherein the first filter is a centrifugal air filter presenting baffle plates.

5. An air purification system for removing airborne particles from an airflow, the system comprising:
    a hood having an inlet for receiving the airflow and a hood outlet for exhausting the airflow;
    a first filter supported by the hood and positioned such that the airflow from the inlet passes through the first filter and at least a portion of the airborne particles therein are removed therefrom to produce a once-filtered airflow;
    a second filter separately connected to the hood at a location downstream of the first filter to receive the once-filtered airflow, the second filter having a filtration chamber that contains a plurality of silica filtration members that remove some airborne particles from the once-filtered airflow to produce second-filtered airflow that is exhausted through the hood outlet; and
    wherein the first filter is a centrifugal air filter presenting a plurality of baffle plates.

6. An air filter system for removing airborne particles from air, the combination comprising:
    a hood having a top wall and a vertical wall that join to define a hood chamber having an inlet in its bottom for receiving a flow of intake air containing airborne particles and an outlet in its top wall for exhausting the flow of air;

a two-stage filter assembly mounted to the hood and disposed in the hood chamber to define an enclosed space that communicates with the hood outlet, the two-stage filter assembly including:

a first filter for receiving the flow of intake air and being operable to remove airborne particles therefrom to produce once-filtered airflow;

a second filter for receiving the once-filtered airflow and producing twice-filtered air that flows through the enclosed space to the hood outlet, the second filter having a porous filtration chamber containing a plurality of filtration members that remove airborne particles from the once-filtered airflow; and wherein the filtration members are formed from a ceramic.

7. The air filter system as recited in claim 6, wherein the ceramic is porous.

8. An air filter system for removing airborne particles from air, the combination comprising:

a hood having a top wall and a vertical wall that join to define a hood chamber having an inlet in its bottom for receiving a flow of intake air containing airborne particles and an outlet in its top wall for exhausting the flow of air;

a two-stage filter assembly mounted to the hood and disposed in the hood chamber to define an enclosed space that communicates with the hood outlet, the two-stage filter assembly including:

a first filter for receiving the flow of intake air and being operable to remove airborne particles therefrom to produce once-filtered airflow;

a second filter for receiving the once-filtered airflow and producing twice-filtered air that flows through the enclosed space to the hood outlet, the second filter having a porous filtration chamber containing a plurality of filtration members that remove airborne particles from the once-filtered airflow; and wherein the first filter is a centrifugal filter.

9. The air filter system as recited in claim 8, wherein the centrifugal filter presents baffle plates extending into the intake air.

10. A ventilation system for removing air from a food cooking area, the combination comprising:

a hood disposed above said food cooking area, the hood having walls which define a hood chamber for receiving intake air containing airborne particles from the food cooking area below;

a duct connected to an exhaust outlet on the hood for exhausting air from the hood chamber; and a two-stage filter assembly mounted to the hood and disposed in the hood chamber to filter airborne particles from intake air flowing from the food cooking area to the exhaust outlet, the filter assembly including:

a first filter for receiving the intake air and being operable to remove airborne particles therefrom to produce once-filtered airflow; and a second filter for receiving the once-filtered airflow and producing a twice-filtered air that flows directly to the exhaust outlet, the second filter having a filtration chamber containing a regenerative filtration material selected from the group consisting of silica, ceramic, diatomaceous earth, and zeolite; and wherein the first filter comprises a centrifugal filter.

11. A ventilation system for removing air from a food cooking area, the combination comprising:

a hood disposed above said food cooking area, the hood having walls which define a hood chamber for receiving intake air containing airborne particles from the food cooking area below;

a duct connected to an exhaust outlet on the hood for exhausting air from the hood chamber; and a two-stage filter assembly mounted to the hood and disposed in the hood chamber to filter airborne particles from intake air flowing from the food cooking area to the exhaust outlet, the filter assembly including:

a first filter for receiving the intake air and being operable to remove airborne particles therefrom to produce once-filtered airflow; and a second filter for receiving the once-filtered airflow and producing a twice-filtered air that flows directly to the exhaust outlet, the second filter having a filtration chamber containing a regenerative filtration material selected from the group consisting of silica, ceramic, diatomaceous earth, and zeolite; and wherein the first filter presents baffle plates extending into a path through which the intake air flows as it passes through the first filter.

12. A method for filtering air drawn from above a cooking area and into an exhaust duct, the steps comprising:

producing once filtered air by passing the air through a first filter which defines by a plurality of walls an air flow path that causes airborne particles in the air to impact the walls and be deposited on the walls and to thereby be removed from the air;

producing twice filtered air by passing the once filtered air through a second filter comprised of a plurality of porous filtration members that absorb airborne particles in the once filtered air; and conveying the twice filtered air to the exhaust duct.

13. The method as recited in claim 12 which includes:

periodically regenerating the second filter to remove a substantial portion of the airborne particles absorbed by the porous filtration members.

14. A filter for use in a hood disposed over a cooking area, the combination comprising:

a first filter mounted to the hood and positioned to receive air drawn from the cooking area, the first filter having a plurality of walls that define a path through which the air flows and against which airborne particles are deposited and thereby removed from the air; and a second filter mounted to the hood and positioned to receive the air drawn from the first filter, the second filter including a plurality of chambers through which the air flows, and each chamber being filled with a plurality of porous filtration members that absorb airborne particles and thereby remove them from the air.

15. The filter as recited in claim 14 in which each chamber is formed by a pair of spaced screens through which a portion of the air flows, and the chambers are disposed at angles with respect to each other to increase the total combined area of their screens.

* * * * *